United States Patent
Sikorski et al.

[11] Patent Number: 5,853,192
[45] Date of Patent: Dec. 29, 1998

[54] VARIABLE VENTED HOUSING

[75] Inventors: Jeffrey Sikorski, Sterling Heights; Jason Raines, Harrison Township; Lynette Norgan-Curtiss, Novi; Matthew Owen, Harper Woods; Gerald Keller, Shelby Township, all of Mich.

[73] Assignee: AlliedSignal Inc., Morristown, N.J.

[21] Appl. No.: 728,588

[22] Filed: Oct. 10, 1996

[51] Int. Cl.⁶ .................................................. B60R 21/30
[52] U.S. Cl. ........................... 280/739; 280/732; 280/740
[58] Field of Search ..................... 280/738, 739, 280/740, 731, 732

[56] References Cited

U.S. PATENT DOCUMENTS

| | | | |
|---|---|---|---|
| 5,184,845 | 2/1993 | Omura | 280/735 |
| 5,330,226 | 7/1994 | Gentry et al. | 280/739 |
| 5,366,242 | 11/1994 | Faigle et al. | 280/739 |
| 5,388,860 | 2/1995 | Brede et al. | 280/739 |
| 5,524,925 | 6/1996 | Rose | 280/739 |

FOREIGN PATENT DOCUMENTS

| | | |
|---|---|---|
| 0 357 225 | 9/1990 | European Pat. Off. . |
| 6040305 | 2/1994 | Japan . |

*Primary Examiner*—Kenneth R. Rice
*Attorney, Agent, or Firm*—Markell Seitzman

[57] ABSTRACT

A system (20) for controlling the effective rate at which an air bag (24) is filled comprising: a housing (22) operatively communicated with the air bag such that as the air bag is pressurized by inflation gas such gas enters the housing increasing its internal pressure, the housing (22) including: variable vent (54, 50, 52) for defining an opening through which a quantity of inflation gas is controllably diverted from the air bag to thereby reduce its rate of inflation from that rate which is achieved when the vent means is closed.

10 Claims, 3 Drawing Sheets

VARIABLE VENTED HOUSING

BACKGROUND AND SUMMARY OF THE INVENTION

The present invention generally relates to air bag inflator systems, modules, housings, inflators and air bags and more particularly to a housing which permits the rate of inflation and/or deflation of the air bag to be changed in accordance with an accident parameter independent of the type of inflator.

Single stage inflators including both the conventional solid propellant inflator and hybrid inflator are capable of producing or providing inflation gas to inflate the air bag at a single inflation rate. U.S. Pat. No. 5,199,740 is illustrative of a single stage driver side hybrid inflator. It has long been recognized that air bag systems should have the capability of inflating the air bag at rates that correspond to certain accident parameters such as the severity of the crash, the size and weight of the occupant, whether the occupant is out of position, etc. U.S. Pat. No. 5,341,988 is illustrative of a hybrid inflator having a dual level output capability. The air bag inflation rate using this type of inflator can be tailored to the severity of the accident. With the inception of what is called a smart restraint system having the capability of sensing if the occupant is in the normal seating position or out of position and the capability of sensing the size (weight) of an occupant, inflators that provide a variable output inflation level can be used to their fullest potential to protect the occupant.

It is an object of the present invention to provide a system that can control the inflation rate of an air bag. Another object of the present invention is to provide a system that is capable of controlling the deflation rate of an air bag. A further object of the present invention is to provide a variable vented housing capable of changing the effective air bag inflation rate from the rate that would be achieved using an inflator with conventional unvented housing. It is an object of the present invention to provide a system that is usable with both single output and multi-output level inflators.

Accordingly the inflator comprises: a system for controlling the effective rate at which an air bag is filled comprising: a housing operatively communicated with the air bag such that as the air bag is pressurized by inflation gas such gas enters the housing increasing its internal pressure, the housing including: variable vent means for defining an opening through which a quantity of inflation gas is controllably diverted from the air bag to thereby reduce its rate of inflation from that rate which is achieved when the vent means is closed.

Many other objects and purposes of the invention will be clear from the following detailed description of the drawings.

DETAILED DESCRIPTION OF THE DRAWINGS

Figure 1:
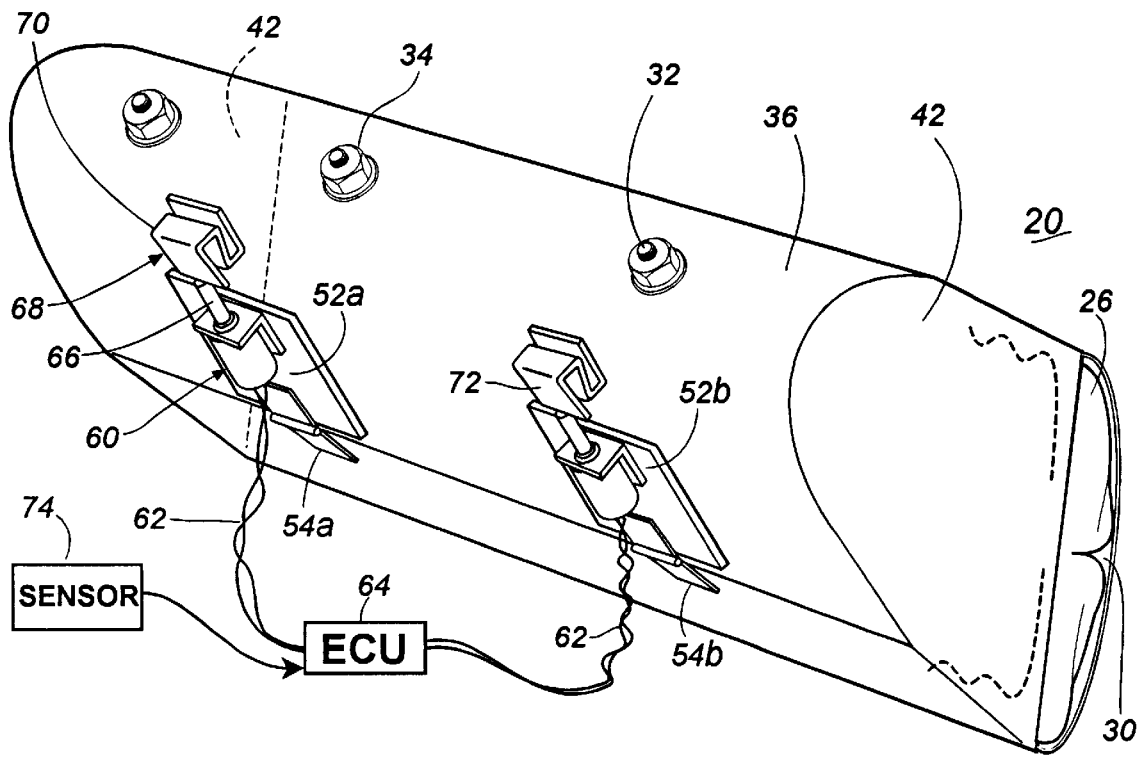
FIG. 1 illustrates a projected view of a portion of the present invention.

Reference is made to FIGS. 1–4 which show a variable vented air bag module 20 comprising a housing 22, air bag 24, deployment cover 26 and a source of inflation gas such as an air bag inflator 28. The deployment cover 26 includes a tear seam 30 which is torn open upon deployment of the air bag. The gas source 28 is secured in a conventional manner to the housing 22 such as by a plurality of threaded fasteners 32 and bolts 34. The fasteners are received through openings in the bottom 36 of the housing 22.

Housing 22 includes opposing side walls 40 and end caps 42 defining a cavity 44 having an open mouth 46. The cover 26 is secured in a known manner proximate the open mouth 46. As can be seen from FIG. 2 the gas source 28 is located within the cavity 44 and prior to the deployment of the air bag, the air bag is located within the housing in a compact, typically folded configuration. As is known in the art, the air bag can be attached to the walls of the housing 22 or about the inflator. While not illustrated, certain installations involving a hybrid inflator utilize an intermediate member such as a hollow, cylindrically shaped manifold received about the gas source or inflator 28. In this case, the air bag 24 may be received about the manifold or as illustrated, secured to the housing 22. Situated on one of the surfaces of the housing are a plurality of openings or vents 50a, 50b. In the embodiment illustrated in FIGS. 1–4, these vents are formed as pre-formed openings within one of the sides 40 although they can be located on both sides and/or on the end caps 42. Associated with each vent 50a,b is a means for selectively opening such vents, the purpose of which will be clear from the description below. Such means comprises doors 52a,b, hinged relative to the housing by corresponding hinges 54a and 54b. Each door 52a,b supports an actuator 60 to control when each door 52a,b opens. In the embodiment illustrated, the actuator 60 comprises a solenoid responsive to a control signal communicated via wires 62 from an electronic control unit (ECU) 64. Each solenoid includes a movable pin or plunger 66 received within a pin holder 68 secured to the housing. The pin holder comprises a bent metal or plastic element 70 having a ledge 72 of sufficient size to overlap the pin 66 in its unactuated position.

As is known in the art, the typical air bag inflator is designed to fill the air bag with inflation gas at a defined fill rate to a resulting internal pressure to protect a large male occupant during a 48 Kph (30 mph) frontal crash. To achieve this desired degree of protection for the larger male occupant implies that the air bag may be forcibly expelled from the housing and filled at a rate that may be less than optimum to protect the smaller occupant, the occupant who is not properly seated, i.e. the out-of-position occupant, or operate optimally with regard to a child seated within a forward or rearward facing child seat. Consequently, it is desirable to be able to control the air bag inflation rate to accommodate the smaller sized occupant, the out-of-position occupant, etc. As mentioned above, one solution is to provide an air bag inflator that is capable of inflating the air bag at a plurality of inflation rates responsive to some or each of these varied conditions. As can be appreciated, this adds to the complexity of the construction of the inflator 28.

In contrast, the present invention provides the flexibility of using inflators having the inflation rate and gas volume capability to protect occupants within the larger physical size range such as those in the 95th percentile while simultaneously achieving protection for the smaller occupant, the out-of-position occupant and the child within the child seat, etc. Reference is again made to FIG. 1. A sensor 74 is shown as providing input data to the ECU 64. The diagrammatically illustrated sensor 74 is to be interpreted as a plurality of sensors sufficient to define crash severity, such as an accelerometer or crash sensor, a sensor or sensors capable of determining whether the occupant is normally seated or out of position or whether or not a child seat is within the path of the inflating air bag, the sensor or sensors which can discriminate between the size and weight of an occupant. This family of sensors has been previously proposed by others in relation to providing an adaptive, intelligent or smart air bag system. The ECU 64 operates upon the data received from the plurality of sensors 74 to determine if the rate at which the air bag is to be inflated is adequate to protect the occupants or if the rate should be lowered based upon one or more crash parameter.

Figure 2:
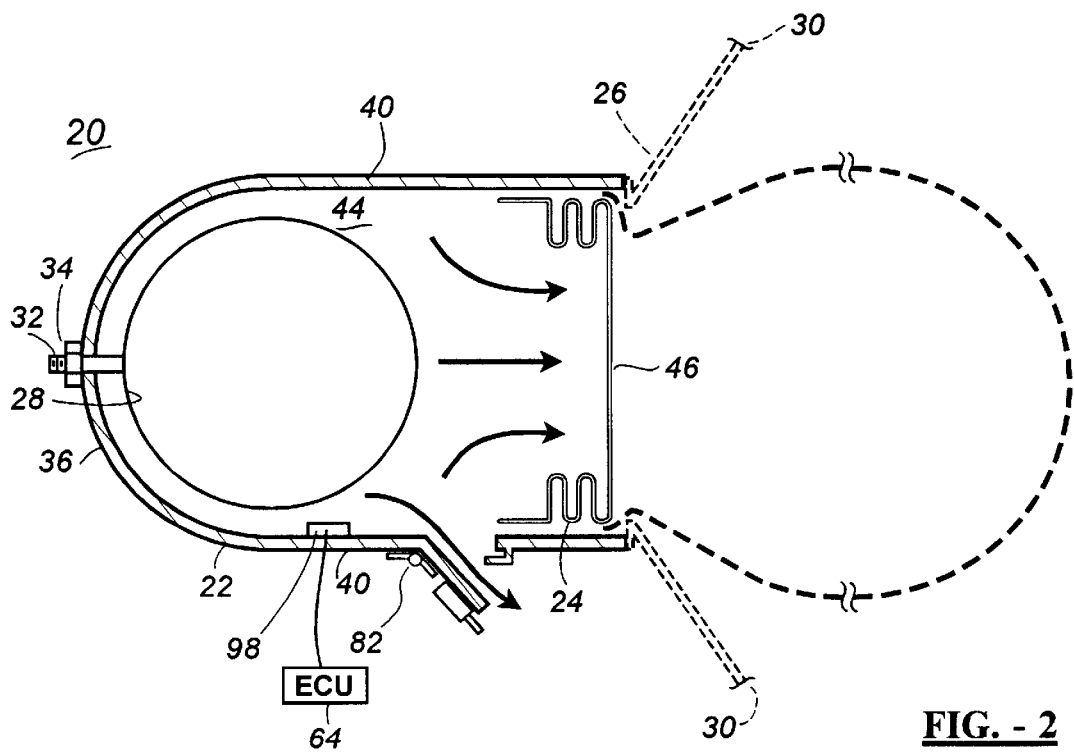
FIG. 2 illustrates a cross-sectional view of an air bag module incorporating the present invention.
Figure 3:
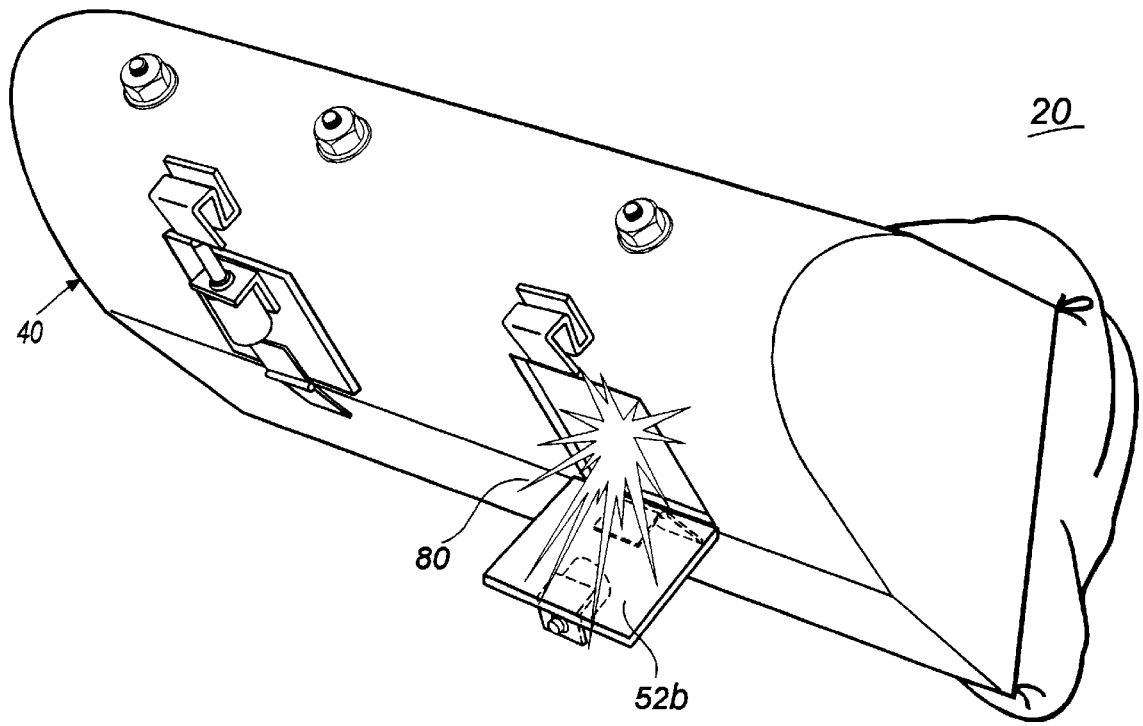
FIGS. 3 and 4 illustrate a housing with one or more vents.
Figure 4:
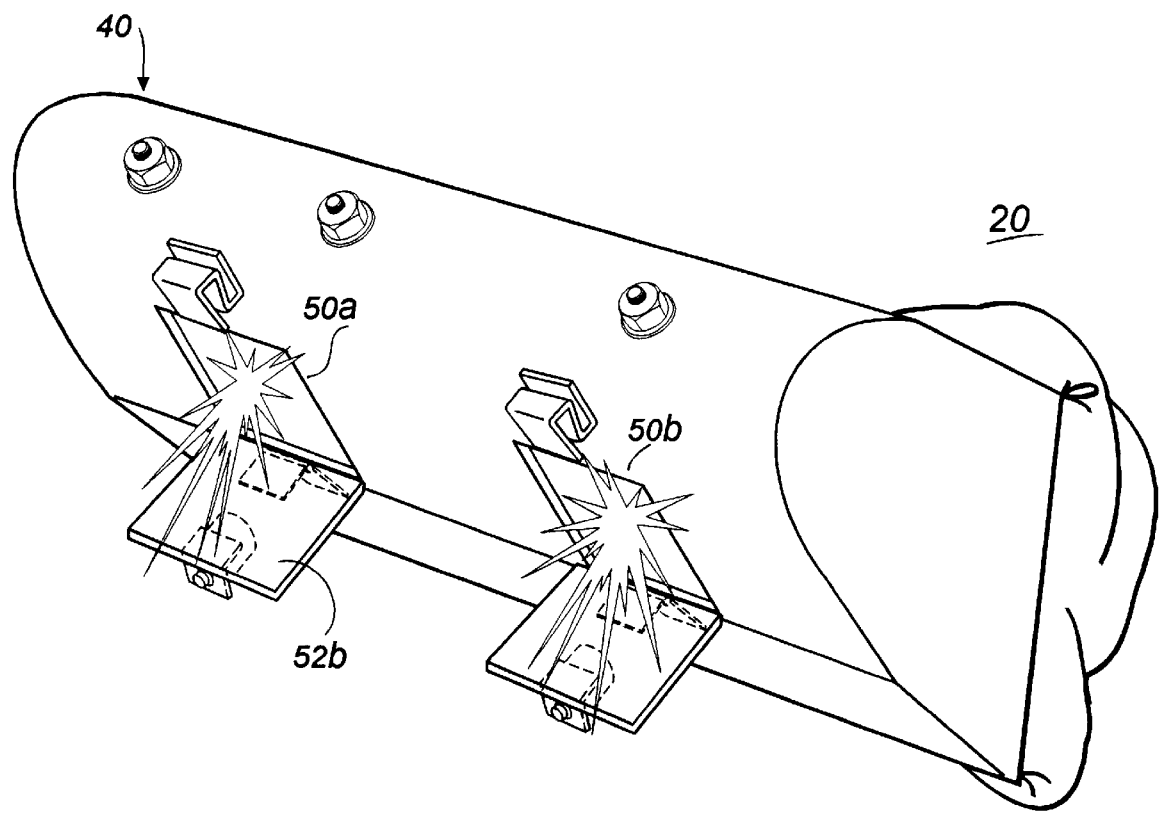

Reference is briefly made to FIG. 2. As can be appreciated, upon activation of the gas source 28 a sufficient quantity of inflation gas is expelled from the gas source to inflate the air bag 24 within a determinable time period, i.e. the inflation rate, and to a determinable internal pressure. As the air bag inflates, the pressurized inflation gases fill the interior of the housing 40 elevating its pressure above ambient pressure. As can be appreciated, if a vent or bleed passage were provided within the housing a determinable quantity of inflation gas will be able to flow through these vents or bleed passages, thereby lessening the amount of inflation gas available to inflate the air bag, consequently the air bag would be inflated at a rate that is less than that which will occur without a vented housing. Typical of those situations in which a lower inflation rate would be applicable would be where the sensors 74 and ECU 64 determine that the occupant is out of position, the occupant is smaller than that for which the inflator was typically designed to optimally protect, the detection of a child seat, the determination that the crash velocity is lower than the design crash velocity (typically 48 Kph). In this situation one or both solenoids 60 would be activated, thereby retracting the pin 66 away from its retainer 70. With the doors 52a,b mounted on a lower side of the housing, once the pin 66 has been retracted from its retainer 70, the respective door 52a or 52b will be forced open both under the action of gravity as well as by the pressure differential across the door. Reference is briefly made to FIG. 3 which illustrates door 52b being opened with a determinable quantity of inflation gas 80 being purged from the housing. If it is desired to inflate the air bag at a rate less than that which would be achieved by opening one door, such as 52b, the other door 52a can be opened as illustrated in FIG. 4.

Reference is again made to FIG. 2 which diagrammatically incorporates a spring 82 proximate the hinge location of the doors 52a,b. The spring 82 is configured so as to bias the doors outwardly. Upon activation of the actuators 60 the spring or springs 82 will rapidly open the doors irrespective of gravity or the internal pressure within the housing. The incorporation of the spring in conjunction with the doors permits the doors to be located on the top side or end caps 42 of the housing (in any orientation such as horizontal, vertical, oblique) in those situations where an enhanced opening rate of such doors is needed. While the above-illustrated embodiment of the invention has been shown with two discrete vents and movable doors, any number of vents and doors may be incorporated within the housing.

The following illustrates an alternate method of operation of the present invention. The doors 52a and 52b described above, can be operated separately or in tandem to control the effective inflation rate of the air bag. As is known in the art, the air bag will become fully inflated typically within 30–70 milliseconds of the beginning of the crash. Subsequently, the occupant will begin to load the air bag, increasing its internal pressure as the occupant gradually moves further into the air bag. Consequently, once having determined the severity of the crash, the ECU 64 can generate a delayed signal, that is, a signal generated after the air bag has been inflated, to the actuator 60 for door 52a to open the previously unopened door 52a in a timed sequence to permit the bag to rapidly depressurize or deflate.

Figure 5:
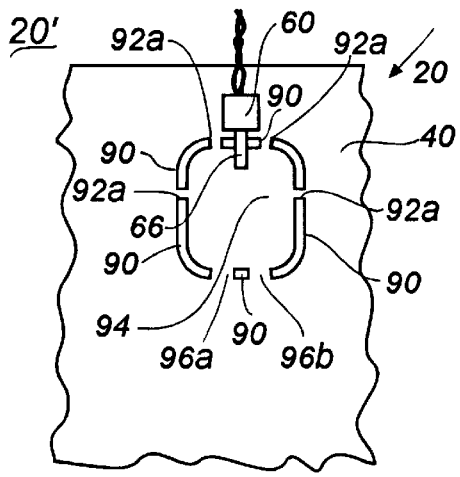
FIG. 5 illustrates an alternate embodiment of the present invention.

Reference is briefly made to FIG. 5 which is a partial plan view showing a portion of one of the side walls 40. In this embodiment the opening 50a or 50b used to define a discrete vent is not used. The wall 40 is perforated by a series of thin, open sections such as would be achieved by laser cutting the side 40 of the housing 20'. The perimeter of these openings 90 defines the desired area of the vent opening. A plurality of thin discrete webs 92a is retained linking the side 40 with a movable flap or door portion 94 (that portion of the side 40 interior to openings 90). The various webs 92a keep the flap 94 dimensionally stable and in line with the remainder of the side 40. One or more of these webs, designated as 96a and 96b, is sufficiently long to define a robust hinge about which the flap 94 rotates. The total area of the webs 92a is chosen such that upon pressurization of the housing 40 to a predetermined level, these webs will break, permitting the flap 94 to rotate outwardly about those web portions 96a,b defining the hinge. The housing 20 of FIG. 5 may further include an electric actuator such as 60 mounted to the wall 40 having an actuating pin 66 which overlaps a portion of the flap 94 to provide a further degree of control in relation to the internal housing pressure at which the flap is opened.

In the embodiment of the invention described in FIG. 5 the various webs 92 would be designed to open at a low first pressure level. With the actuator 60 activated, that is with the pin 66 withdrawn (in response to a signal from ECU 64) from interaction with the flap, the flap 94 will open when the internal pressure within the housing exceeds this first pressure level, thereby permitting inflation gas either during inflation of the air bag or during its depressurization to open. Alternatively, if the actuator 60 is not activated, the pin 66 will prohibit the flap 94 from opening at the first pressure level. Upon activation of the actuator in response to a signal generated by the ECU, the opening of flap 94 can be delayed and then pushed open by the pressure internal to the housing. If desirable, a pressure sensor diagrammatically shown as 98 can be installed within the housing and communicated to the ECU 64 such that the various actuators 60 can be energized in response to actual pressure measurements.

Figure 6:
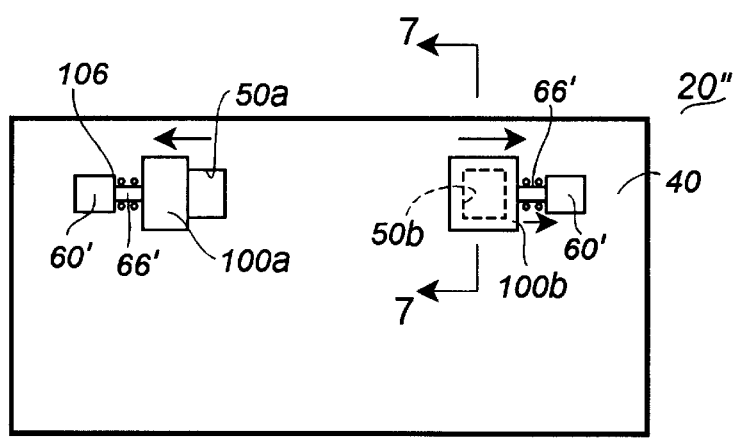
FIGS. 6 and 7 illustrate a further embodiment of the invention.
Figure 7:
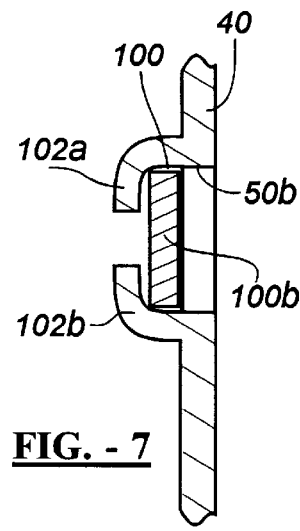

Reference is made to FIG. 6 which illustrates a side view of housing 20" having a side wall 40 with a plurality of discrete openings or vents 50a and 50b. The housing defines a track or groove generally shown as 100 in FIG. 7 which may be defined by two opposing, curved sections of wall 40 material. Situated within each track 100 (one for opening 50a and one for opening 50b) is a slidable door 100a (and 100b) moved by an actuator 60'. More particularly, the doors 100a,b are connected with actuator pins 66' of each actuator 60'. Each actuator 60' may be a single-step or multi-step solenoid. With regard to the single-step actuator, the retractive motion of the pin moves the door 100a,b sufficiently to expose the entire open area of the corresponding vent 50a,b. Alternatively, with the multi-step solenoid actuator the distance that each vent 50a,b is exposed will be directly proportional to the step wise activation of the solenoid. Each actuator 60' may include a bias spring 106 which biases the door 100*a,b* to close. In the absence or termination of the control signal to the actuator 60' the door is moved to its closed position fully covering the vent opening 100*a,b*. In this manner, the amount of venting or purging of inflation gas during the inflation and subsequent depressurization of the air bag can be more finely controlled.

Figure 9:
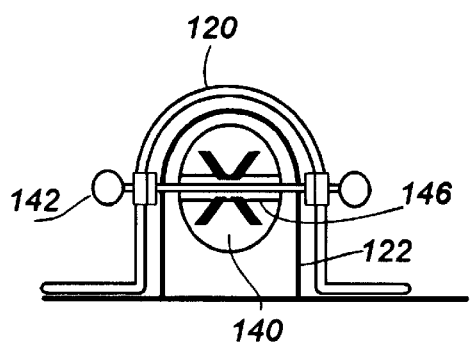
FIGS. 8 and 9 show an additional embodiment of the invention.
Figure 8:
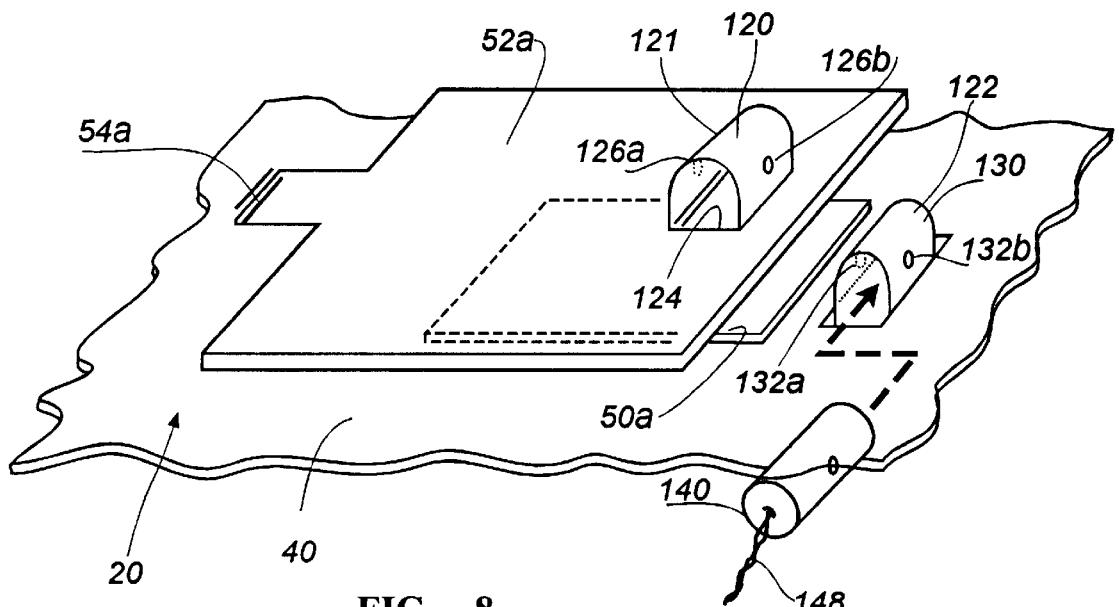

Reference is made to FIGS. 8 and 9 which show a further alternative embodiment of the invention. FIG. 8 illustrates a partial view showing a portion of wall 40 of the housing 20. The wall includes at least one opening such as 50*a* enclosed by a flap or door 52*a* which is hinged at 54*a*. The housing and door include interlocking members 120 and 122. Member 120 includes a boss or protrusion 121 formed of the door material and positioned over an opening 124 within the door 52*a*. The protrusion 121 includes a plurality of opposed openings 126. The member 122 may also be formed as a protrusion or boss 130 of the side wall material or some other protruding object attached thereto. The boss 130 includes opposed openings 132*a* and *b*. While the members 120 and 122 are shown offset in FIG. 8, they are shown in their actual mating positions in FIG. 9 in which member 122 fits within member 120. A pyrotechnic wire cutting mechanism 140, such as Model No. 1SE192 manufactured by Eagle-Picher Inc., is positioned within a cavity formed within member 122. A lock wire 142 is threaded through openings 132*a,b*, 126*a,b* and through an opening 146 within the wire cutter 140. In response to an activation signal communicated to wires 148 of the wire cutter 140 the lock wire 142 is severed, permitting member 120 to disengage from member 122 thereby permitting door 52*a* to rotate upon its hinge 54*a* in response to the pressure build-up within the housing 20. As can be appreciated, the control of the doors 52*a,b* can be controlled electrically using solenoids by electrical pyrotechnic wire cutters, cutting mechanisms, explosive bolts, or other means which operate sufficiently quickly (having a response time of approximately 30 milliseconds)

Many changes and modifications in the above described embodiment of the invention can, of course, be carried out without departing from the scope thereof. Accordingly, that scope is intended to be limited only by the scope of the appended claims.

We claim:

1. A system (20) for controlling the effective rate at which an air bag (24) is filled comprising:

a housing (22) operatively communicated with the air bag such that as the air bag is pressurized by inflation gas such gas enters the housing, the housing (22) including:
variable vent means (54, 50, 52) for defining an opening through which a quantity of inflation gas is controllably diverted from the air bag to thereby reduce its rate of inflation from that rate which is achieved when the vent means is closed; including at least one opening within a wall (40) of the housing (22), a door (52*a,b*; 100*a,b*) the motion of which is controlled by an actuator (60, 60', 60") and which when moved from the opening permits inflation gas to exit therefrom;
wherein the actuator is attached to and movable with the door, wherein a movable element (66) of the actuator is operatively connected to a securing means (70) for preventing the door from opening and wherein when the movable element is moved from the securing means the door is movable to an open position in which inflation gas is free to flow through the opening.

2. The device as defined in claim 1 wherein the inflation gas is provided by an inflator or gas generator within the housing.

3. The device as defined in claim 1 wherein the actuator is electrically actuated.

4. The device as defined in claim 1 wherein the door (54*a,b*) is rotatably mounted relative to the housing (22).

5. The device as defined in claim 1 further including control means for activating the actuator means in response to an accident parameter.

6. A system (20) for controlling the effective rate at which an air bag (24) is filled comprising:

a housing (22) operatively communicated with the air bag such that as the air bag is pressurized by inflation gas such gas enters the housing, the housing (22) including:
variable vent means (54, 50, 52) for defining an opening through which a quantity of inflation gas is controllably diverted from the air bag to thereby reduce its rate of inflation from that rate which is achieved when the vent means is closed; including at least one opening within a wall (40) of the housing (22), a door (52*a,b*; 100*a,b*) the motion of which is controlled by an actuator (60, 60', 60") and which when moved from the opening permits inflation gas to exit therefrom;
wherein the door is restrained from moving relative to the housing by a lock wire and wherein the device further includes first cutting means for severing the wire lock.

7. The device as defined in claim 6 wherein the first means is activated in response to an electric signal.

8. A system (20) for controlling the effective rate at which an air bag (24) is filled comprising:

a housing (22) operatively communicated with the air bag such that as the air bag is pressurized by inflation gas such gas enters the housing, the housing (22) including:
variable vent means (54, 50, 52) for defining an opening through which a quantity of inflation gas is controllably diverted from the air bag to thereby reduce its rate of inflation from that rate which is achieved when the vent means is closed; including at least one opening within a wall (40) of the housing (22), a door (52*a,b*; 100*a,b*) the motion of which is controlled by an actuator (60, 60', 60") and which when moved from the opening permits inflation gas to exit therefrom;
wherein the door is hinged to the housing.

9. The device as defined in claim 8 wherein the hinge is formed integrally with the housing.

10. A system (20) for controlling the effective rate at which an air bag (24) is filled comprising:

a housing (22) operatively communicated with the air bag such that as the air bag is pressurized by inflation gas such gas enters the housing, the housing (22) including:
vent means (54, 50, 52) for defining an opening through which a quantity of inflation gas is controllably diverted from the air bag to thereby reduce its rate of inflation from that rate which is achieved when the vent means is closed; and
a second vent means, which is opened subsequent to inflation of the air bag, for controlling the deflation of the air bag.

\* \* \* \* \*